United States Patent [19]

Sadler

[11] Patent Number: 4,867,133
[45] Date of Patent: Sep. 19, 1989

[54] SOLAR COLLECTOR METHOD AND APPARATUS

[76] Inventor: Charlton Sadler, P.O. Box 446, Brooksville, Fla. 33512

[21] Appl. No.: 80,444

[22] Filed: Jul. 31, 1987

Related U.S. Application Data

[63] Continuation-in-part of Ser. No. 844,117, Mar. 26, 1986, Pat. No. 4,718,404.

[51] Int. Cl.$^4$ .......................... F24J 2/24; F16L 21/08
[52] U.S. Cl. .................................... 126/448; 165/173; 138/174; 285/370; 285/915; 285/921
[58] Field of Search ................. 126/448, 450, DIG. 2; 165/173; 138/174; 285/137.1, 239, 242, 370, 915, 921

[56] References Cited

U.S. PATENT DOCUMENTS

| | | | |
|---|---|---|---|
| 3,163,448 | 12/1964 | Franklin | 285/137.1 |
| 3,169,552 | 2/1965 | Fawick | 138/174 X |
| 3,242,691 | 3/1966 | Robinson et al. | 138/133 X |
| 3,349,806 | 10/1967 | Roberts | 138/174 X |
| 3,469,863 | 9/1969 | Riester et al. | 285/137.1 |
| 3,524,661 | 8/1970 | Farnam | 285/239 |
| 4,062,351 | 12/1977 | Hastwell | 126/432 X |
| 4,217,887 | 8/1980 | Hoffman et al. | 126/448 |
| 4,222,373 | 9/1980 | Davis | 126/448 |
| 4,268,041 | 5/1981 | Sovish et al. | 277/1 |
| 4,271,103 | 6/1981 | McAlister | 264/1 |
| 4,291,683 | 9/1981 | Bayles | 126/448 |
| 4,321,911 | 3/1982 | Offutt | 126/448 |
| 4,345,805 | 8/1982 | Finley et al. | 339/16 R |
| 4,474,173 | 10/1984 | Ford | 126/450 |

FOREIGN PATENT DOCUMENTS

| | | | |
|---|---|---|---|
| 1359919 | 3/1964 | France | 285/260 |
| 2462668 | 3/1981 | France | 126/450 |
| 908930 | 10/1962 | United Kingdom | 285/260 |
| 1288648 | 9/1972 | United Kingdom | 285/915 |

OTHER PUBLICATIONS

J. P. Wisnewski, "All-Glass Solar Collector", from *Nasa Tech. Briefs*, Fall 9/1979, vol. 4, No. 3, p. 359.

*Primary Examiner*—Martin P. Schwadron
*Assistant Examiner*—Allen J. Flanigan
*Attorney, Agent, or Firm*—Dominik, Stein, Saccocio, Reese, Colitz & VanDerWall

[57] ABSTRACT

A coupling arrangement between a manifold having nipples and a solar panel having nipple receiving orifices. Each nipple is formed with a plurality of primary circumferential projections adjacent to the free forward end and a supplemental circumferential projection adjacent to the manifold. The primary projections have radial surfaces as well as surfaces inclined in a first direction while the supplemental projection has a radial surface as well as a surface inclined in the opposite direction. The coupling arrangement further includes a circumferential recess in each interior orifice of the solar collector, shaped and located for receiving its associated additional projection. Also disclosed is an improved arrangement for coupling together manifolds or grooves and recesses.

15 Claims, 5 Drawing Sheets

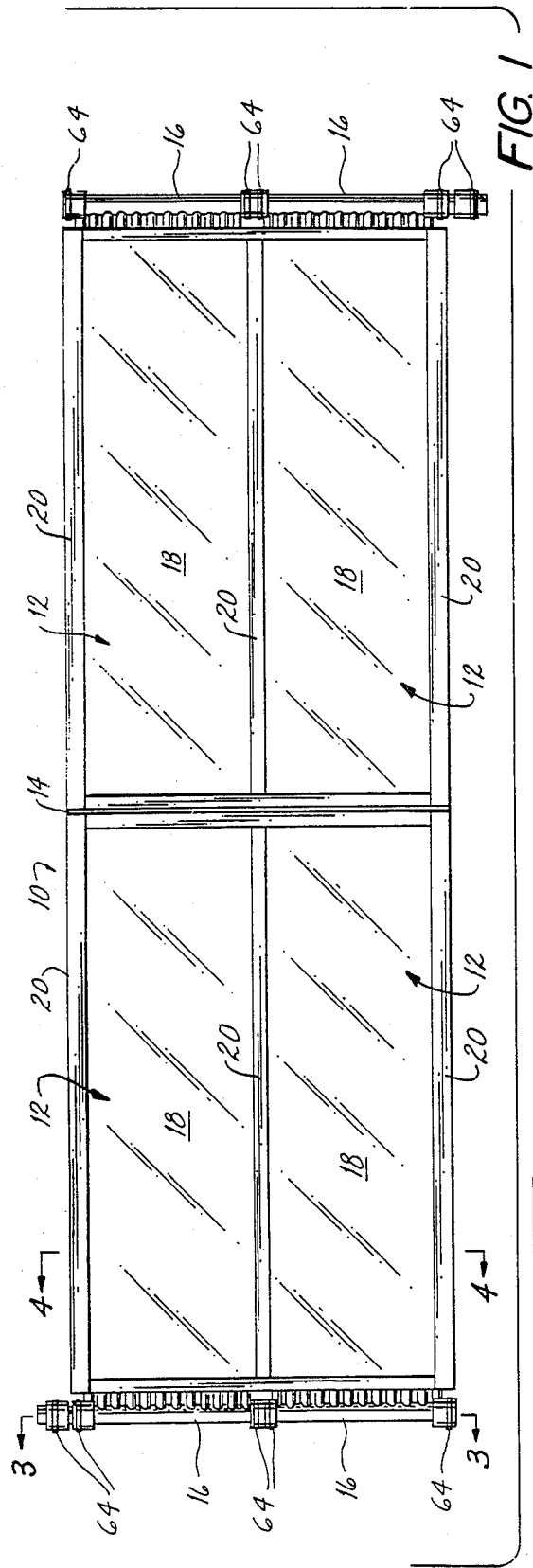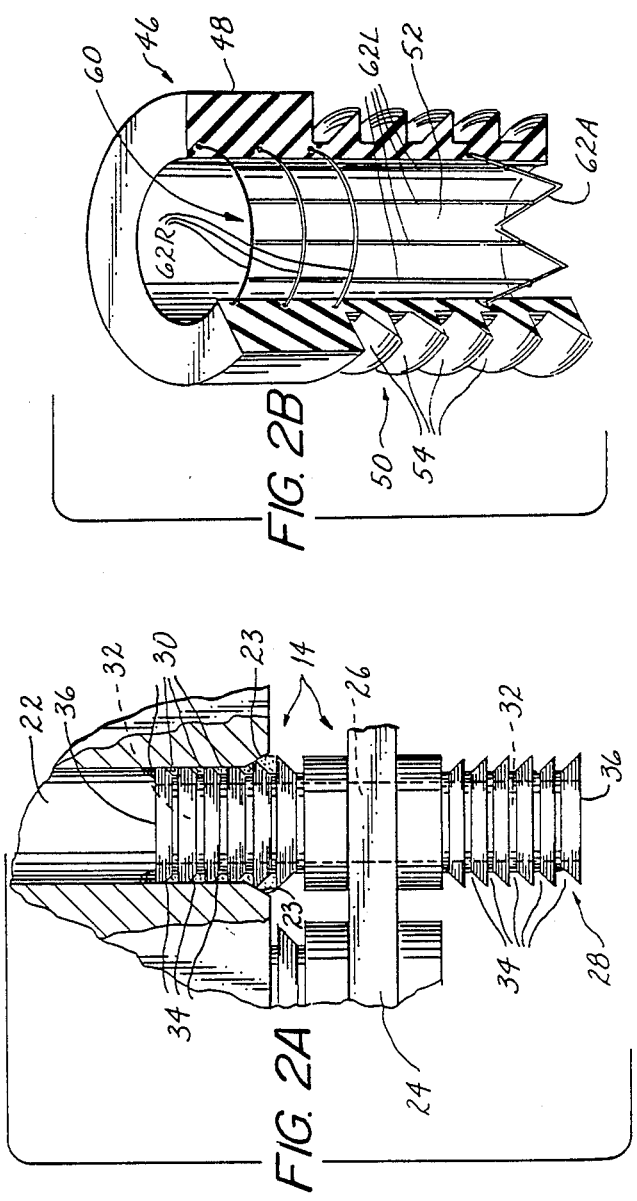

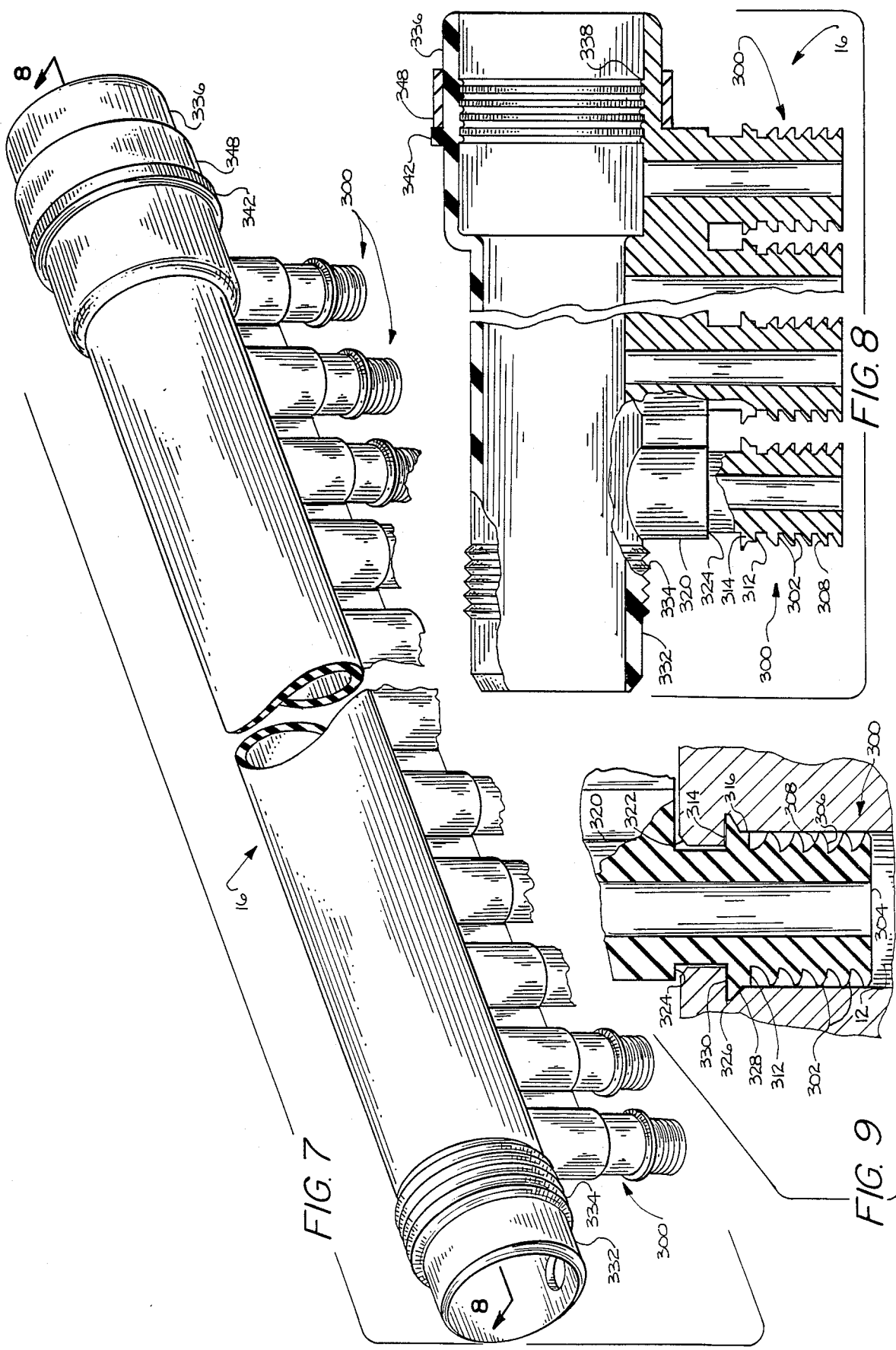

SOLAR COLLECTOR METHOD AND APPARATUS

CROSS REFERENCE TO RELATED APPLICATION

This application is a continuation-in-part Application of U.S. patent application Ser. No. 844,117, filed Mar. 26, 1986 in my name now U.S. Pat. No. 4,718,404.

BACKGROUND OF THE INVENTION

1. Field of the Invention

This invention relates generally to solar collectors and, more particularly, to an apparatus and method for forming a solar collector by an extrusion process utilizing ceramic or similar materials. This invention also relates to manifolds for fluidly interconnecting a series of extruded solar collectors. Additionally, this invention still further relates to building roof construction composed of a plurality of extruded solar collectors positioned side by side and interconnected by a unique manifold system. Finally, this invention further relates to manifolds with improved nipples to effect a more secure coupling of manifolds to solar collectors and with improved manifold ends to effect a more secure coupling between manifolds.

2. Description of the Background Art

Presently, the substantial increase in the cost of fuel has encouraged investigation into alternative forms of energy to meet the needs of coming generations. Significant emphasis has been placed on the investigation of nuclear power, wind power, wave power and solar power. Among the most promising of these alternatives is the collection of solar energy. Solar energy has the advantage of being environmentally safe and producing no waste products. In addition, the source of power is essentially limited only by the number of collectors constructed. Solar collectors are also capable of operation at almost any location without concern for environmental impact on the location.

Experience has shown that the most economical solar collectors comprise liquid heating solar collectors which are capable of being mounted of the roof of commercial and residential buildings. These liquid heating solar collectors typically comprise aluminum, copper or other metallic solar collectors which are relatively costly to manufacture. While less expensive plastic extruded solar collectors have been developed, the relatively high cost of both of these types of collectors has discouraged the widespread use of the units on building installations. In addition, such state-of-the-art solar collectors typically cannot withstand the exposure of sunlight and other environmental factors and, therefore, degrade with time.

In my prior application, Ser. No. 921,053, now U.S. Pat. No. 4,170,983, the disclosure of which is hereby incorporated by reference herein, I invented a unique method and apparatus for manufacturing solar collectors from a liquid ceramic material. The solar collectors were formed by positioning a first and a second mold element of a liquid absorbing material relative to one another to form a mold cavity. The mold cavity defined the outer configuration of the solar collector. The mold cavity was then filled with a curable material, such as liquid ceramic material or any other material which cures upon the loss of liquid. The mold cavity was drained when the curable material was cured adjacent to the first and second mold elements, thereby removing the internal uncured material to define the internal configuration of the solar collector. The solar collector was then fired to provide a solar collector of a ceramic material having input and output manifolds with a plurality of fluid connection paths extending therebetween.

The use of ceramic as a component material for a solar collector can be readily appreciated by those skilled in the art. History has established that ceramic material is durable for use as a roof tile and like. Accordingly, my prior invention provided a low-cost system which is durable, thereby resulting in a feasible solar collector for commercial and domestic installations. The raw material costs and manufacturing costs are extremely low in comparison to conventional aluminum, copper and other metallic solar collectors now known in the art. Further, in comparison to plastic solar collectors, ceramic solar collectors are impervious to the adverse effects of the environment, including ultraviolet radiation from the sun.

Possibly the only disadvantage to my prior invention, now U.S. Pat. No. 4,170,983, is the requirement of a large number of mold elements for mass production. Accordingly, my new invention disclosed below utilizes the same advantages of ceramic materials, with further production capability using an extrusion process to form a main body member of the solar collector of the desirable ceramic material or the like.

It is noted that U.S. Pat. No. 4,114,597 teaches the use of an extrusion process for a thermal setting material. Unfortunately, such material does not have the thermal conductive properties of ceramic material nor the reliability, ruggedness and historical tests of time of ceramic materials. In addition, the use of ceramic material in an extrusion process provides a unique method whereby a substantially integral or one-piece collector may be formed by an extrusion process and then interconnected with similarly formed ceramic collectors having a large surface area.

Indeed, state-of-the-art solar collectors are typically required to be mounted upon a roof or other solid support base in order to support the individual collector elements thereon. Consequently, there exists a need for a solar collector of such strength and durability that the solar collector itself may be supported by roof joists or the like to constitute the roof of a structure.

Therefore, it is an object of this invention to provide an apparatus and method which overcomes the aforementioned inadequacies of the prior art apparatuses and methods and provides an improvement which is a significant contribution to the advancement of the solar collector art.

Another object of this invention is to provide an apparatus and method for extruding a ceramic solar collector in significant lengths having great durability and rigidity and which may be assembled together to constitute the roof of a structure.

Another object of this invention is to provide unique manifolds to interconnect the inputs and outputs of a row of extruded ceramic solar collectors which can be accomplished in the field by relatively inexperienced artisans.

Another object of this invention is to provide connectors for interconnecting, end to end, a series of extruded ceramic solar collectors to produce a solar collector having a length several times longer than the extruded length and which may then be connected to adjacent serially connected extruded ceramic solar collectors by use of the manifolds.

Another object of this invention is to provide a solar collector comprising a transparent material, such as glass, mounted upon a support material, such as closed-cell foam glass, affixed to the surface of the interconnected, extruded ceramic solar collectors to create a "greenhouse" effect thereby increasing the efficiency of the solar collector.

Another object of this invention is to provide a method and an apparatus for manufacturing an economical extruded ceramic solar collector using readily available ceramic materials such that the resultant solar collector may be manufactured throughout the world.

Another object of this invention is to provide manifolds with improved coupling arrangements between manifold nipples and a solar panels having nipple receiving orifices, wherein each nipple is formed with a plurality of primary circumferential projections adjacent to the free forward end and a supplemental circumferential projection adjacent to the manifold, the primary projections having radial surfaces as well as surfaces inclined in a first direction while the supplemental projection has a radial surface as well as a surface inclined in the opposite direction and the coupling arrangement further includes a circumferential recess in each interior orifice of the solar collector, shaped and locate for receiving its associated additional projection.

Lastly, it is an object of the invention to provide manifolds with improved connectors at their ends to ensure secure coupling therebetween.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a solar collector apparatus and method comprising a body member having a plurality of longitudinally extending orifices along the entire length of the solar collector between opposing ends of the body member. More particularly, the body member of the extruded ceramic solar material may be extruded from an extrusion press into which is forced a supply of ceramic material. This process operates continuously to produce an integrally formed body member. Depending upon the selected length of the solar collector, the continuously extruded body member may be sliced at appropriate increments defining such a length. Further, the diameter and number of longitudinally extending orifices may be selected as desired to produce an extruded solar collector of a particular width and with orifices having particular surface area exposed to a fluid flowing therethrough.

The invention further comprises a unique connector for interconnecting, end-to-end, a series of extruded ceramic solar collectors. More particularly, the connector of the invention comprises a ribbon of base material having a plurality of apertures therethrough to correspond to the number and distance apart of the longitudinally extending orifices of the solar collector. A plurality of nipples extend from both sides of the ribbon of base material and are positioned concentrically about the apertures in alignment with the corresponding longitudinally extending orifices of the solar collector. The ends of the nipples are appropriately dimensioned to fit into the corresponding orifices of the solar collector and be sealed therewith by means of an adhesive such as silicone. The outer circumferential surface of the nipples includes annular grooves which force the adhesive into the respective orifices thereby assuring adequate seal therebetween. Finally, the ribbon of base material and the respective nipples may be integrally formed from an elastomer such as a 60-70 durometer Santoprene or the like by injection molding. Santoprene is a trademark of Monsanto Chemical Company of St. Louis, Mo.

The invention still further comprises a unique manifold system for interconnecting the inputs or outputs of a plurality of extruded ceramic solar collectors positioned side by side with one another. More particularly, each unique manifold of the invention comprises a conduit member having a male connector at one end and a female connector at the other. The manifold approximates the width of the solar collector such that one is needed for each solar collector positioned side by side. The conduit member includes a plurality of outwardly extending nipples corresponding to the number and size of the longitudinally extending orifices of the solar collector. These manifold nipples comprise a design similar to that of the connector nipples and, thus, extend into the respective orifices and form a seal therewith by means of an adhesive. The walls of the conduit member and the nipples may be reinforced with a wire mesh thereby preventing undue expansion of the conduit and nipples upon being pressurized with a fluid such as water. Further, slip rings are provided to allow easy interconnection of the conduit member with the conduit member of an adjacent solar collector. Indeed, it is contemplated that a manifold would be factory assembled with one segment of the extruded solar collector and then simply connected end to end with adjacent manifolds through the use of the slip rings as the solar collectors are positioned side by side.

After all of the solar collectors are interconnected end to end through the use of the connectors and are positioned side by side with the respective manifolds interconnected, the entire surface area of the combined solar collectors may be fitted with a transparent material such as glass positioned above the surface of the collectors by means of a cross-hatch of closed-cell glass foam affixed to the surface by means of an adhesive such as silicone. Indeed, the positioning of the sheets of glass above the surface of the solar collectors reduces the heat loss of the collector due to circulating air over the collector.

Finally, due to the inherent rigidity and strength of the extruded ceramic solar collectors of the invention as described above, such solar collectors may be assembled together to form a water-tight roof of a structure such as a pavilion, carport, or the like. Specifically, the extruded ceramic solar collectors may be suspended at opposing ends by roof joists angled in such a manner that the surface of the solar collectors are angled relative to the movement of the sun to achieve optimum efficiency throughout the winter months. A plurality of rows of such solar collectors could be so supported by respective joists such that a large roof assembly could be manufactured.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a plan view of a plurality of solar collectors of the invention interconnected end to end by means of a connector and side by side by means of a manifold;

FIG. 2A is an enlarged view, partially in section, of connector illustrating the annular grooves formed on the outside surface of a nipple of the connector which forces the adhesive into the orifice of the solar collector and illustrating the nipple to be sealed therewith partially inserted within the orifice;

FIG. 2B is a partial perspective view of the expandable wire cage formed internally with the nipples of the manifold;

FIG. 7 is a partial perspective view of the manifold and connector ends and nipples constructed in accordance with an additional embodiment of the invention;

FIG. 8 is a partial sectional view of the nipples, manifold and solar collector taken along line 88 of FIG. 7; and FIG. 9 is an enlarged sectional view of one nipple of FIG. 8.

Similar reference characters refer to similar parts throughout the several views of the drawings.

DETAILED DESCRIPTION OF THE PREFERRED EMBODIMENT

Figure 2:
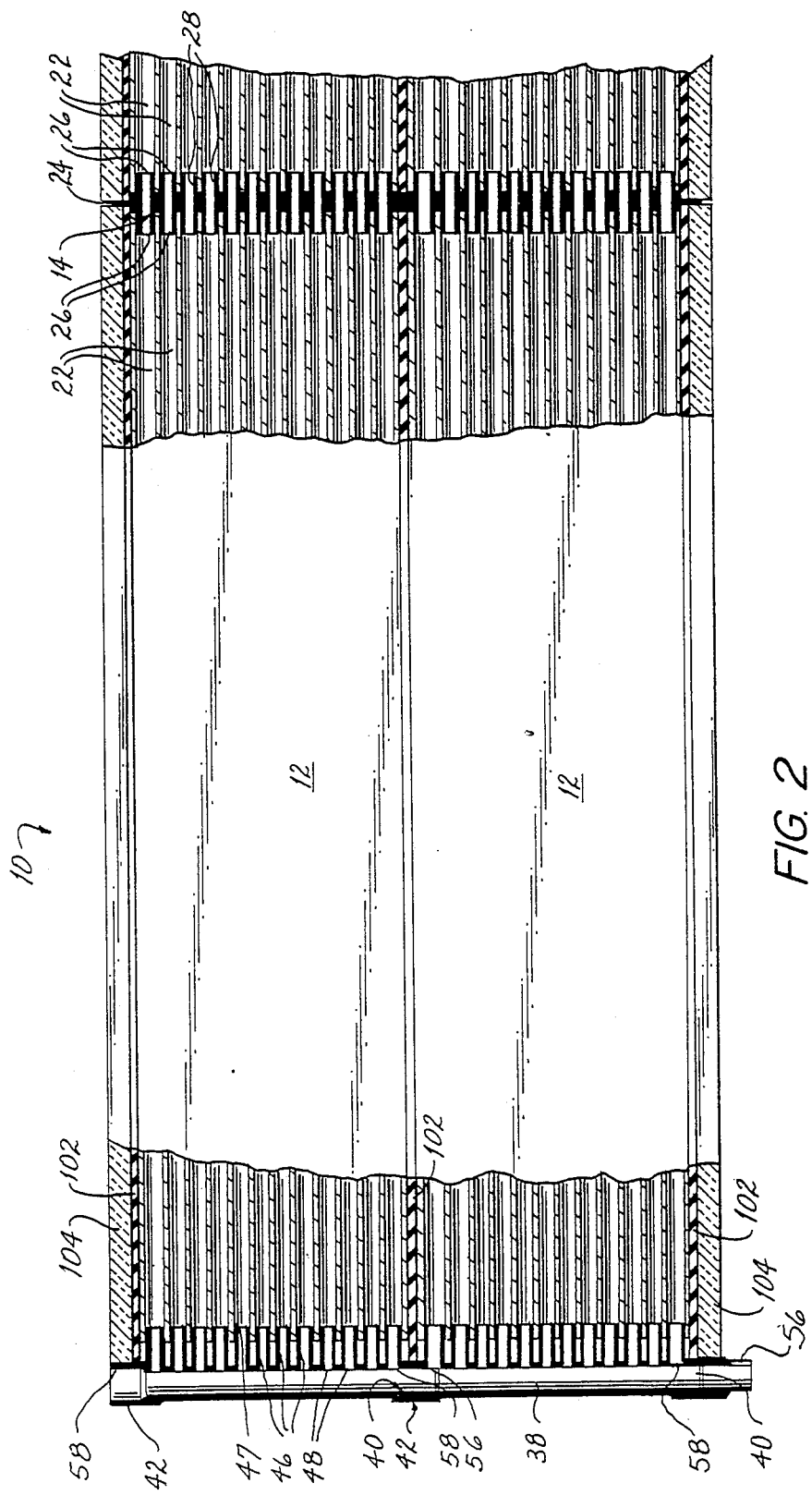
FIG. 2 is a partial cross-sectional view of FIG. 1 along the midsection of the solar collectors illustrating the longitudinal cross-section of the solar collectors, the connectors, and the manifolds.

Referring to FIGS. 1 and 2, the solar collector system 10 of the invention comprises a plurality of extruded ceramic solar collectors 12 connected end to end by means of connectors 14. A plurality of serially connected solar collectors 12 are then positioned in a side by side relationship with each other and fluidly connected together by means of interconnected manifolds 16. A plurality of sheets of transparent material 18 is positioned above the surface of the solar collectors 12 by means of a cross-hatched network of closed-cell glass foam 20.

More particularly, the extruded solar collectors 12 are manufactured by an extrusion process in which a supply of ceramic material is forced through an extrusion die to continuously produce a continuous length of extruded material having a plurality of equally spaced longitudinally extending orifices 22. The extruded material is supported by a conveyor means, not shown, as it is extruded from the die and is then sliced at desired lengths. The desired lengths of the solar collector 12 are then fired to fully cure the ceramic material to optimum density. It is noted that a heat absorbing color, such as black, may be glazed onto the surface of the solar collector 12 prior to firing to increase the heat absorbing characteristics of the solar collector 12. It is also noted that the openings of the longitudinally extending orifices 22 may be reamed to a slightly taped configuration to facilitate interconnection with the connectors 14 and manifolds 16.

As shown in FIGS. 2 and 2A, the connectors 14 function to interconnect the respective longitudinally extending orifices 22 of solar collectors 12 positioned end to end. More particularly, each of the connectors 14 comprises a ribbon of body material 24 having a length approximating the width of the solar collector 12 and a height approximating the thickness of the solar collector 12. A plurality of apertures 26 are positioned through the ribbon of body material in an equally spaced-apart position relative to one another to correspond to the equal spacing of the longitudinally extending orifices 22. A plurality of connector nipples 28 are affixed about the apertures 26 on opposing sides of the ribbon of body material 24. Each of the nipples 28 is dimensioned to engage into the corresponding orifice 22 and form a seal therewith by means of an adhesive 30. Each of the nipples 28 includes a longitudinal hole 32 along its entire length such that a fluid communication path is established between corresponding orifices 22 of the interconnected solar collectors 12.

As shown in FIG. 2A, each of the nipples 28 includes a plurality of annular grooves 34 formed integrally with the nipple 28. Each of the grooves 34 are angularly disposed about the circumference of the nipple 28 toward the tip 36 of the nipple 28. Further, the edge 23 of the orifices 22 are chamfered (preferably 3/16 of an inch) to allow the grooves 34 to be inserted therein. With such configurations, it should be appreciated that with adhesive 30 applied to the grooves 34, the tilted grooves 34 function to force the adhesive 30 into the respective orifices 22 while being slightly compressed. Consequently, an adequate amount of adhesive 30 is forced into the orifice 22 to assure an adequate seal with the respective nipples 28. Finally, it is noted that the ribbon of body material 24, the nipples 28, and their grooves 34 ma be integrally formed through the use of injection molding techniques. Preferably, the connector 14 is manufactured from a 60 to 70 Durometer EPDM or similar material capable of providing an adequate bond with silicone adhesive 30 to the ceramic orifices 22.

Figure 3:
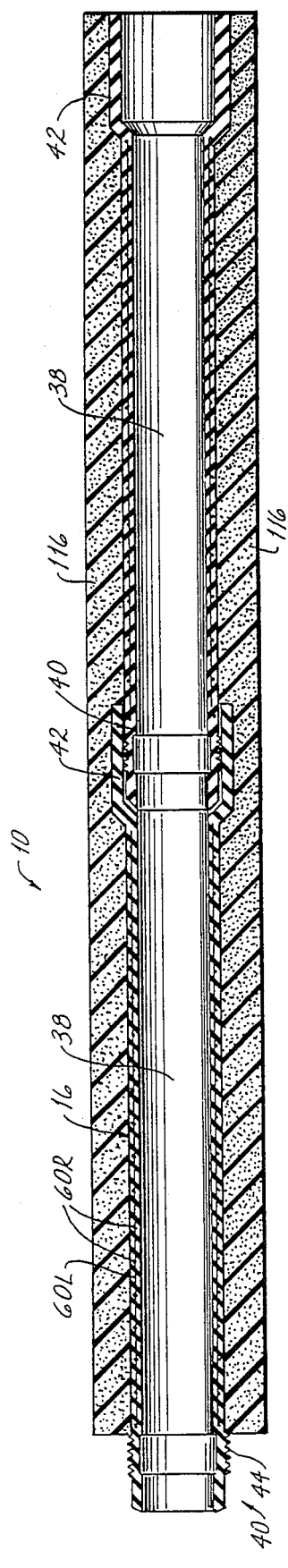
FIG. 3 is an enlarged cross-sectional view of FIG. 1 along the longitudinal length of the manifolds showing the cross-sectional configuration of the manifolds and the manner in which the manifolds are serially interconnected with one another.

Referring to FIGS. 2 and 3, each manifold 16 of the solar collector system 10 of the invention comprises a conduit member 38 having a generally circular cross-sectional configuration. A male connector, generally indicated by the numeral 40, is integrally formed at one end and a female connector, generally indicated by numeral 42, is integrally formed at the other end of the conduit member 38. The male connector 40 includes a diameter approximately equal to the diameter of the conduit member 38. A plurality of annular groves 44 are integrally formed within the outer circumference of the male connector 40. The female connector 42 comprises an increased diameter greater than that of the male connector 40 and conduit member 38 such that the male connector 40 may be fitted therein. Further, the length of the male connector 40 is approximately equal to the inner length of the female connector 42 such that the male connector 40 may be fully fitted into the female connector 42.

The manifold 16 further comprises a plurality of nipples 46 radially extending from the wall of the conduit member 38 along the longitudinal length thereof. Each of the nipples 46 comprises a base portion 48 integrally formed with the wall of the conduit member 38 and a grooved portion 50. (See FIGS. 2B and 5) Both portions 48 and 50 include a hole 52 extending longitudinally along the length of the nipple 46 into the interior of the conduit member 38. The nipples 46 are equally spaced-apart from one another such that the grooved portions 50 correspond and fit into the respective longitudinal extending orifices 22 of the solar collector 12. The grooved portion 50 of the nipples 46 comprises a plurality of grooves 54 similar in configuration to the grooves 34 of the nipples 28 of the connectors 14, as illustrated in FIG. 2A, to force adhesive 47 into the respective orifices 22 during assembly.

As noted earlier, the male connector 40 and female connector 42 of adjacent solar connectors 12 are designed to serially engage one another to serially interconnect manifolds 16 of adjacent solar collectors 12. However, due to the uniform spacing of the longitudinally extending orifices 22 of each of the solar collectors 12, it is noted that it is necessary to form a slot 56 and 58 in the male and female connectors 40 and 42, respectively, such that the respective connectors 40 and 42 may fully engage into one another without engaging or overlapping the leading and trailing-most nipples 46 of the adjacent manifolds 16. Each such slots 56 and 58 may comprise a blind slot having a rounded bottom approximating the diameter of the longitudinal hole 52 and the base portion 48 of the nipples 46, respectively.

The above described manifold 16 of the invention may be composed of a large variety of presently available materials from plastics to rubber materials. The entire structure of the manifold 16 may be economically produced by known injection molding techniques. However, it is noted that when the manifold 16 is composed of a relatively resilient material, such as rubber, excessive and undesirable stretching of the rubber may occur along the length of the manifold 16 and the base portion 48 of the nipples 46. In order to reduce such undesirable stretching, the manifold 16 may further comprise a wire cage 60 or other reinforcement means imbedded within the walls of the manifold 16 during the injection molding process. More particularly, cage 60 may comprise generally circular rings 60R positioned in a spaced-apart manner by a plurality of longitudinal wires 60L running the length of the manifold 16 from connector to connector 40 and 42. The rings an longitudinal wires 60R and 60L are welded together at their contact points to provide a rigidly sound structure imbedded within the material constituting the manifold 16.

In a similar fashion, the nipples 46 of the manifold 16 may be reinforced with imbedded wires 62. Specifically, referring to FIG. 2B, the nipples 46 may be reinforced by similarly disposed circular rings 62R and longitudinal wires 62L welded together within the base portion 48 of the nipples 46 which are, in turn, welded to the circular rings 60R and longitudinal wires 60L of the conduit member 38. However, only the longitudinal wires 62L, and not the circular rings 62R, extend into the groove portion 50 of the nipples 46. This assures that the walls of the grooved portion 50 of the nipples 46 can expand outwardly against the lumen of the orifice 22 of the solar collector 12 to increase the bond therewith, particularly when the system 10 is pressurized with water or other fluid. Further, it is noted that outward expansion of the grooved portion 50 within orifice 22 may be further enhanced by welding an accordion shaped wire 62A, composed of spring steel, to the terminal ends of the longitudinal wires 62L within the grooved portion 50. Such a configuration may be sufficiently compressed to allow the nipples 46 to engage into the respective orifices 22 but, once in place, exert an outward force against the lumen of the orifice 22 during the curing of the adhesive 47.

During mass production, it is contemplated that the connectors 14 and/or the manifolds 16 would be installed to the respective solar collectors 12 for later transport to the site of installation. On the site, another solar collector 12 without a connector 14 fitted therein, can be quickly and easily fitted to the factory installed connector 14 through the use of adhesive 30. Similarly, another solar collector 12 having a manifold 16 installed thereon can be quickly and easily fitted to the manifold 16 of an adjacent solar collector 12 through the use of adhesive 47. In this regard, it is noted that added bonding of the male and female connectors 40 and 42, respectively, may be accomplished through the use of a circular clamp or ring 64 positioned about the female connector 42.

Figure 4:
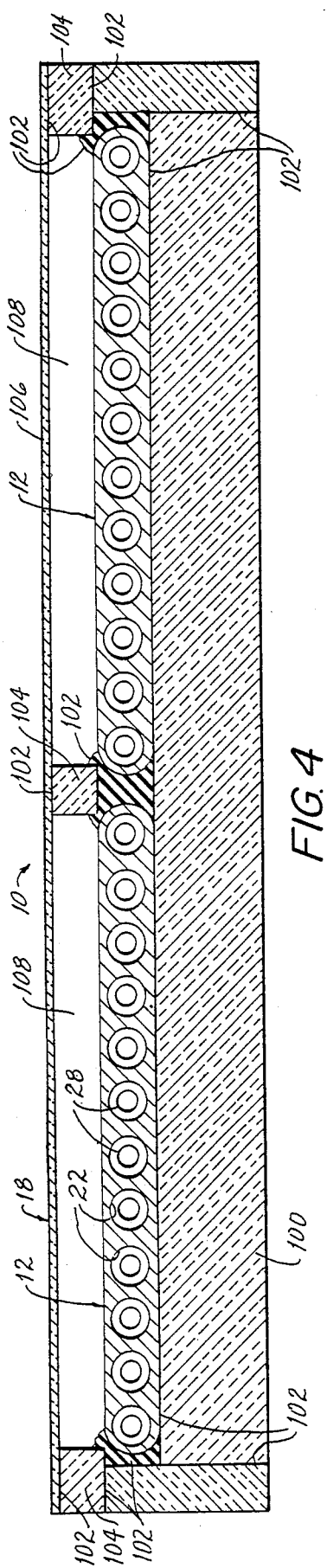
FIG. 4 is a cross-sectional view of FIG. 1 along lines 4—4 illustrating the manner in which the sheets of glass are positioned above the surface of the collectors by means of the closed-cell foamed glass.

Referring to FIG. 4, the interconnected solar collectors 12 are insulated on their undersides by a sheet of closed-cell glass foam 100 affixed to the underside of the solar collectors 12 by means of silicone adhesive 102 or the like. Further, silicone adhesive 102 is injected into the areas between adjacent solar collectors 12 to function an expansion joint while sealing the adjacent solar collectors 12 together. A plurality of closed-cell glass foam strips 104 are adhered to the upper surface of the solar collectors 12 by means of similar silicone adhesive 102. Preferably, the closed-cell glass foam strips 104 are positioned in a cross-hatch pattern coinciding with the joints between adjacent solar collectors 12. One or more sheets of transparent material 106, such as glass, is then adhered to the upper surface of the closed-cell glass foam strips 104 by similar silicone adhesive 102 or the like. As a result, the glass sheets 106 are spaced-apart from the upper surface of the solar collectors 12 thereby defining a plurality of air spaces 108 therebetween. Air spaces 108 isolate the upper surface of the solar collector 12 from air currents thereby reducing heat loss. Further, the blackened glazed surface of the solar collectors 12 significantly increasing the solar efficiency of the system 10.

Figure 5:
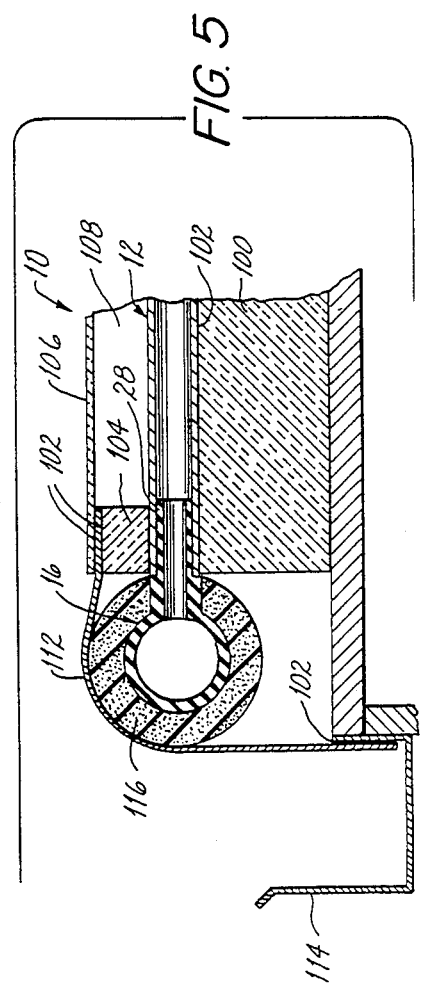
FIG. 5 is a partial cross-sectional view of the manifold fitted to a collector illustrating the manner in which a piece of arcuate metal may be formed about the manifold to shield the manifold from ultraviolet radiation from the sun while assuring that debris, such as leaves, impinging upon the solar collector throws off of the solar collector.

As shown in FIG. 5, an arcuate sheet of aluminum or steel 112 may be positioned over the manifolds 16 to protect the manifolds 16 from contamination due to debris such as leaves. Indeed, the arcuate sheet 112 may extend into a conventional gutter 114 as shown in FIG. 5. The arcuate sheet 112 is preferably secured into position over the manifold 16 by engaging its edge underneath the lip of the glass sheet 106 and then securing the same into place by means of silicone adhesive 102. Finally, it is noted that the manifold 16 may be insulated from the environment by positioning conventional pipe insulation 116 thereabout along its length.

From the foregoing, it should be appreciated that the solar collector system 10 of the invention can be mounted on virtually any surface in both domestic and commercial applications. Further, it should be appreciated that a large number of solar collectors 12 may be serially connected end to end and adjacent to one another by means of the connectors 14 and the manifolds 16 to constitute a relatively large surface area exposed to the sun. When serially connected, a set of manifolds 16 can function as the input of the solar collector system 10 with the other set of serially connected manifolds 16 functioning as the output. The input and output may be connected in closed loop cycle with an appropriate fluid pump and heat storage facility, such as a tank and be cycled on and off, depending upon the availability of heat in the collectors 12. Further, the collectors 12 may be equipped with suitable drain-down systems to drain the collectors 12 of water in the event of freezing conditions.

Notwithstanding the versatility in utilizing the solar collector system 10 of the invention, the system 10 is uniquely adaptable to constitute the roof of a structure such as a pavilion, carport, or the like. More particularly, referring to FIG. 6, a roof structure, generally indicated by the numeral 200, may be composed of a plurality of solar collectors 12 connected end to end by means of connector 14 and connected side by side by a series of interconnected manifolds 16 functioning as the input to the collectors 12 and by another series of interconnected manifolds 16 at the other end functioning as the output. Each row of end to end collectors 12 positioned side by side may be supported by a framework, generally indicated by numeral 202, such that the row of solar collectors 12 are tilted to an advantageous angle relative to the path of the sun as is customary in the trade. Further, the row of collectors 12 may have one corner 204 positioned higher than the other corner 206 of the upper edge such that the entire set of solar collectors 12 can be drained of the heat transfer fluid (water) by conventional drain-down systems in the event of freezing conditions.

Figure 6:
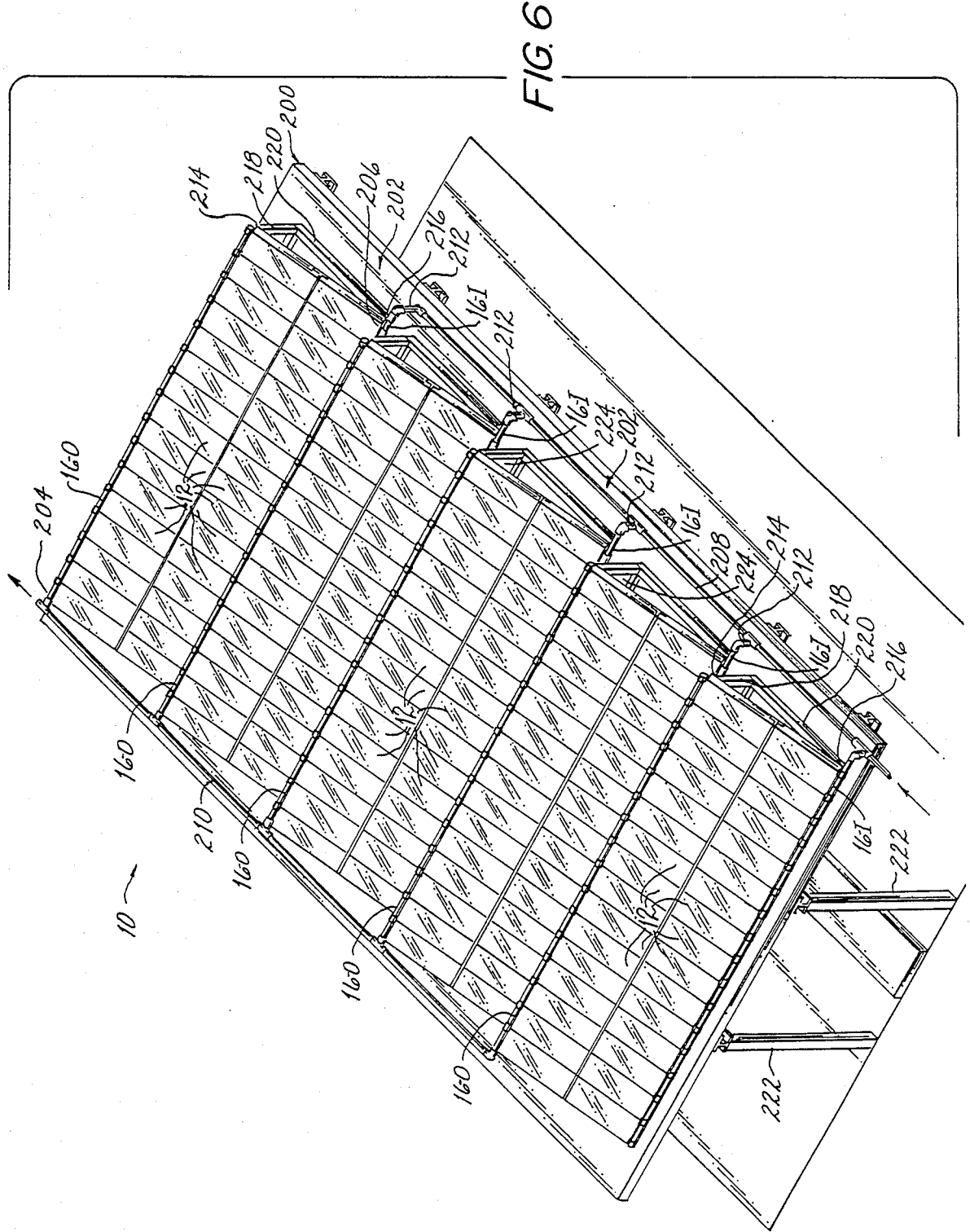
FIG. 6 is a perspective view of a roof structure composed of a plurality of angled rows of collectors of the invention positioned side by side.

It should be appreciated that the number of solar collectors 12, positioned side by side in the row, is almost limitless and, hence, a solar collector system 10 may be assembled with an extremely large surface area exposed to the sun. Moreover, as illustrated in FIG. 6, a plurality of rows of solar collectors 12 can be supported by respective frameworks 202 and interconnected with adjacent rows of collectors 12 by interconnecting input and output conduits 208 and 210, respectively, connected to each set 16I of input manifolds and each set 160 of output manifolds. This parallel relationship of the rows of solar collectors 12 can also be virtually unlimited to increase the total collector area exposed to the sun. However, in order to accomplish draining of each of the collectors 12, the conduits 208 and 210 must be appropriately angled and connected to the sets 16I and 160 of the manifolds 16 with intermediate conduits 212.

Since the extruded ceramic solar collectors 12 are extremely strong and durable, the actual construction of the framework 202 is greatly simplified as it need only support the ends of the collectors 12. Indeed, framework 202 may simply comprise upper and lower joists 214 and 216, respectively, extending the length of the row of collectors 12 and supported by upstanding members 218 and base members 220. The entire framework 202 and the solar collector system 10 supported thereby may then be elevated by upstanding posts 222. Further, a sheet of transparent or translucent material 224 may be sealingly affixed to the upper and lower ends of each row of the solar collectors 12 to form a water-tight roof structure 200. Thus, the roof structure 20 supported in an elevated position uniquely functions as a pavilion, carport, open garage or the like. Consequently, the solar collector system 10 of the invention may be constructed over existing parking facilities to supply solar energy to the commercial application and covered parking for the commercial installation's employees.

FIGS. 7, 8 and 9 disclose a modified manifold and collector of a design superior to that most clearly seen in FIGS. 2B and 5. It has been found that the previously described design works adequately except during operating conditions of greater pressure or higher fluid flow. Under such more demanding conditions, there is a tendency of a solar collector to separate from its associated manifold. To overcome this problem, the improved design includes an arrangement having a manifold with nipples wherein each nipple 300 is formed with a plurality of circumferential primary projections 302 adjacent to the free forward end 304, the end remote from the manifold. Each projection 302 is formed with a forwardly facing radial surface 306 and an inclined surface 308 facing in a rearward direction. The primary projections 302 correspond to the grooves 54 of the previously described embodiment. The forwardly facing radial surfaces 306 of the primary projections 302 are for assisting in the pushing of grease into the orifice of its associated collector in a manner similar to the pushing of adhesive as in the previously described embodiment. Since the parts to be coupled in this alternate embodiment are more positively held together than in the first embodiment, an adhesive is not required to retain their coupling. A lubricious material, preferably grease, is used to facilitate their coupling. The shape of the nipples along with the chamfered holes of the solar collector in which they are received, allows for the grease to remain on the length of the nipples.

Beyond this, however, a single circumferential supplemental projection 312 is formed on each nipple rearwardly of the primary projections between the manifold and the primary projections. Each single supplemental projection has a rearwardly facing radial surface 314 and a forwardly facing inclined surface 316 which is angled oppositely from the angle employed in the primary projections. The tendency of this orientation of surfaces for the supplemental projection is to provide greater resistance to movement of the nipple out of the orifice in which it is received while minimizing the force required to effect its insertion. This is because a radially extending projection with radial and inclined surfaces will more readily bend in the direction away from the inclined surface and, therefore, more easily slide in the direction of the inclined surface.

Each nipple 300 has a radially interior portion 320 of an enlarged diameter located adjacent to, and formed integral with, the manifold 16. The radially exterior end of each interior portion terminates with a shoulder 322. A web 318 extending between the nipples functions to define the operative position of the solar collector and the manifold. As can be understood, the diameter of the interior portion 320 is slightly greater than the diameter of the orifice of the solar collector to effect the intended positioning function. The radially exterior portion of each nipple is of a reduced diameter and is provided with the primary projections 302 as described above. Between the interior and exterior portions, and formed integrally therewith, is the radially intermediate portion 324 which is of an intermediate diameter and which is provided with the supplemental projection 312, also as described above. The diameter of the intermediate portion 324 is slightly less than the interior diameter of the orifice of the solar collector in which it is to be received. The diameter of the supplemental projection is substantially equal to, or slightly larger than, the diameter of the interior portion 320 in order to effect the intended holding function as will be described hereinafter. The diameter of the primary projections is substantially equal to the intermediate portion 324 and to the interior diameter of the solar collector orifice in order to effect the intended grease pushing function.

The tendency of the nipples to be retained in the orifices is additionally enhanced through the use of the circumferential recess 326 in each orifice of the solar collector. Each recess is provided with a forwardly facing inclined surface 328 and a rearwardly facing radial surface 330 located adjacent to the end of its orifice a distance whereby the supplemental projection 312 of each nipple will be received by its associated recess 326 when coupled in position for operation and use. The cross-sectional configurations of the supplemental projections and recesses are essentially identical for effecting the desired secure coupling needed to restrict the separation that would otherwise occur in the previously described embodiment when operating under operating conditions of greater pressure or higher fluid flow. The unique configurations of the projections and recesses thus allow the insertion of the desired grease along with the nipples while providing a more secure connection between manifolds and collectors.

It should also be appreciated that the nipples of this improved embodiment are provided with central, axial holes 52 as in the previously described embodiment as well as embedded wires of the type shown in FIG. 2B and also the exterior arcuate sheet and pipe insulation as shown in FIG. 5.

The manifold of the present invention includes yet one further additional feature which constitutes an improvement over the invention described in the above-discussed parent application. As discussed above, when operating a solar panel under conditions of high pressure or high fluid flow, the manifold-to-solar panel coupling might be strained. Similarly, the ends of the manifolds at the ends of the conduit member 38 might become strained, even to the point of separation of one manifold from another or the separation of the manifolds from the region where they couple with the water input and outlet conduits.

In order to insure a more secure coupling between manifolds, the male connectors 40 and female connectors 42, are provided with supplemental securement features to insure that separation does not occur even during operation and use during conditions of high pressure and high fluid flow. For this purpose, the end of each manifold 16 with the male connector 332 is formed with annular projections 334 extending outwardly from the exterior surface in a manner similar to the annular grooves 44 as shown in FIG. 3. In a similar manner, the other end of each manifold, the female connector 336 is formed with annular recesses 338 in its interior surface. The projections and recesses of the male and female connectors of each manifold are formed in a symmetric V-shaped configuration of a corresponding size, shape, number and location for the positive coupling together of manifolds as well as the coupling together of the free ends of the manifolds to the conduits by which water is received by, and dispensed from, the manifold of manifolds.

The coupling of manifolds together as described above is further enhanced by an annular strengthening rib 342 projecting radially from the exterior surface of each female connector. Each rib is located to circumferentially overlie the annular recesses 338 to preclude enlargement thereof. A surface 344 is also provided axially exteriorly of the rib 342 whereby a strengthening strap 348, as of metal, in a ring-shaped configuration may be slid over the exterior surface of the female connector for providing even further strength to the female connector to preclude separation of coupled connectors. The axially interior edge of the strap 348 is preferably slid into contact with the axially exterior edge of the rib 342 whereby the strap, in addition to the rib, will overlie the annular recesses of the female connector.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,

What is claimed is:

1. A solar collector system, comprising in combination:

an extruded solar collector composed of a ceramic material produced by an extrusion process and composed of a vitrified ceramic material with a plurality of orifices longitudinally extending therethrough;

an input manifold having a central conduit member with male and female ends and a plurality of radially extending nipples corresponding to the plurality of orifices;

an output manifold having a central conduit member with male and female ends and a plurality of radially extending nipples corresponding to the plurality of orifices, each nipple having a plurality of primary projections each with a radial surface and a surface inclined with respect to the nipple axis, each nipple also having a supplemental projection with a radial surface and a surface inclined oppositely from the incline of the primary projections;

means for positioning said nipples of said input manifold into one end of the plurality of orifices and for positioning said nipples of said output manifold into the other end of the plurality of orifices such that a fluid flowing into said input manifold flows through said nipples of said input manifold into the plurality of orifices and then through said nipples of said output manifold into said output manifold;

a sheet of transparent material affixed in a spaced-apart position above said solar collector by means of a stand-off material;

said stand-off material comprises strips of insulated material adhered to said solar collector and said sheet of transparent material;

said strips of material comprises closed cell glass foam;

an insulated material positioned about said manifolds; and an arcuate member adhered between said sheet of transparent material and said strip of material and positioned over one of said manifolds to prevent debris from being deposited between said manifold and said solar collector.

2. The solar collector system as set forth in claim 1 wherein each orifice has a circumferential recess for receiving a supplemental projection.

3. The solar collector as set forth in claim 1 wherein said male ends of said manifolds include annular projections extending from the exterior surfaces thereof and said manifolds include annular recesses formed into the interior surfaces thereof, said projections and said recesses being of corresponding size, shape, number and location for coupling together input manifolds and output manifolds.

4. The solar collector as set forth in claim 3 and further including an annular rib projecting from the exterior surface of each said female connector overlying said annular recesses and further including a ring-shaped strap positioned over; said exterior surface of each said female connector overlying said annular recesses with one edge thereof in contact with one edge of said annular rib.

5. A nipple formed in a cylindrical configuration with an exterior surface and a free end, said exterior surface having a plurality of primary projections formed therein, each said primary projection having a radial surface facing toward said free end and a surface inclined relative to the nipple axis in a first direction, said exterior surface also including a supplemental projection located between said primary projections and said free end, said supplemental projection having a radial surface facing away from said free end and a surface inclined in a direction opposite from the first direction.

6. Coupling apparatus between a manifold having a cylindrical nipple and a solar collector having a cylindrical orifice, said coupling apparatus including a plurality of primary projections formed in the nipple, each said primary projection having a radial surface facing away from the manifold and a surface inclined relative to the nipple axis in a first direction, said coupling apparatus also including a supplemental projection located between said primary projections and the manifold, said supplemental projection having a radial surface facing toward the manifold and a surface inclined in a direction opposite from the first direction, said coupling apparatus also including a recess formed in the orifice for the receipt of said supplemental projection.

7. A manifold for connection to a solar collector having a plurality of orifices extending longitudinally therethrough, comprising in combination:

a conduit member;

a male connector affixed to one end of said conduit member;

a female connector affixed to the opposite end of said conduit member for receiving an associated male connector, said male and female connectors being formed with mating circumferential projections and recesses for thereby allowing a plurality of manifolds to be serially connected to fluid communication with one another;

a plurality of nipples having a longitudinal hole therethrough extending from said conduit member corresponding to the plurality of orifices of the solar collector, each said nipple being configured to fit into the respective orifices, each said nipple comprising a base portion and a grooved portion, said grooved portion being positionable into the respective orifices, each said nipple also comprising means for exerting a radially outwardly directed force on said grooved portion when positioned in the respective orifices; and means for sealingly engaging said nipples in the respective orifices.

8. The manifold as set forth in claim 7 wherein said seal means comprises an adhesive.

9. The manifold as set forth in claim 7, wherein said grooved portion comprises a plurality of grooves circumferentially positioned about the exterior of said grooved portion.

10. The manifold as set forth in claim 9, wherein said grooves are tilted toward the tip of said nipples to force said adhesive into a chamfered edge of the respective orifices during assembly.

11. The manifold as set forth in claim 10, further including means for reinforcing said conduit member from excessive expansion.

12. The manifold as set forth in claim 11, wherein said reinforcement means comprises a cage imbedded in said conduit member.

13. The manifold as set forth in claim 12, wherein said nipple comprises reinforcement means to prevent expansion of said base portion.

14. The manifold as set forth in claim 13, wherein said reinforcement means of said nipples comprises a cage imbedded within said base portion.

15. The manifold as set forth in claim 7, wherein said means for exerting a radially outwardly directed force within said grooved portion comprises a plurality of longitudinally extending wires having a accordion-shaped wire affixed to the ends thereof and imbedded within said grooved portion, said accordion-shaped wire being comprised of spring steel to exert an outward force of said grooved portion positioned within the respective orifices.

* * * * *